(12) United States Patent
Fache et al.

(10) Patent No.: US 9,121,109 B2
(45) Date of Patent: Sep. 1, 2015

(54) BODY FOR ACTUATED VALVE, CORRESPONDING ACTUATED VALVE AND THE MANUFACTURING PROCESS THEREOF

(71) Applicant: Generale de Robinetterie Industrielle et de Systemes de Surete (GRISS) S.A., Armentieres (FR)

(72) Inventors: Olivier Fache, Noyon (FR); Eric Vincent, Brouchy (FR); Eric Gest, Essigny-le-Petit (FR); Damien Bergot, Bethancourt-en-Vaux (FR)

(73) Assignee: Generale de Robinetterie Industrielle et de Systemes de Surete S.A., Armentieres (FR)

( * ) Notice: Subject to any disclaimer, the term of this patent is extended or adjusted under 35 U.S.C. 154(b) by 229 days.

(21) Appl. No.: 13/662,106

(22) Filed: Oct. 26, 2012

(65) Prior Publication Data

US 2013/0105718 A1      May 2, 2013

(30) Foreign Application Priority Data

Oct. 27, 2011   (EP) .................................. 11290497

(51) Int. Cl.
*F16K 1/22*      (2006.01)
*C25D 13/14*    (2006.01)
(Continued)

(52) U.S. Cl.
CPC ............... *C25D 13/14* (2013.01); *F16K 1/221* (2013.01); *F16K 27/0218* (2013.01); *F16K 37/0008* (2013.01); *F16K 1/222* (2013.01);
(Continued)

(58) Field of Classification Search
CPC . F16K 1/221; F16K 37/0008; F16K 27/0218; F16K 1/222; F16K 1/2261; F16K 1/2268; C25D 13/14; Y10T 29/46416; Y10T 137/0525
USPC .................................. 251/305, 306, 308, 314
See application file for complete search history.

(56) References Cited

U.S. PATENT DOCUMENTS 3,095,177 A * 6/1963 Muller .......................... 251/173
3,526,385 A    9/1970 Rohrer
(Continued)

FOREIGN PATENT DOCUMENTS

EP   0 071 750 A2   2/1983
GB   1 178 742 A    1/1970
(Continued)

OTHER PUBLICATIONS

International Search Report and Written Opinion from International Application No. PCT/IB2012/004325, mailed Jan. 23, 2013.
(Continued)

*Primary Examiner* — Marina Tietjen
(74) *Attorney, Agent, or Firm* — Quarles & Brady LLP

(57) ABSTRACT

A body for an actuated valve, the actuated valve comprising flow regulating means for regulating the flow of a fluid between an input bore and an output bore of a barrel, and actuating means for controlling a position of the flow regulating means, the body comprising:
a barrel having at least the input bore and the output bore;
an actuating volume inside of which at least part of the actuating means can be placed, wherein
the barrel and the actuating volume are integrally formed in a single piece.

12 Claims, 8 Drawing Sheets

(51) Int. Cl.
*F16K 27/02* (2006.01)
*F16K 37/00* (2006.01)
*F16K 1/226* (2006.01)

(52) U.S. Cl.
CPC ............ *F16K 1/2261* (2013.01); *F16K 1/2268* (2013.01); *Y10T 29/49416* (2015.01); *Y10T 137/0525* (2015.04)

(56) References Cited

U.S. PATENT DOCUMENTS

| | | | |
|---|---|---|---|
| 3,565,394 A * | 2/1971 | Smith | 251/306 |
| 4,465,260 A * | 8/1984 | Conley et al. | 251/305 |
| 4,510,965 A | 4/1985 | Peroux et al. | |
| 4,604,254 A * | 8/1986 | Yamamoto et al. | 264/254 |
| 5,277,216 A | 1/1994 | Horton | |
| 5,284,178 A | 2/1994 | Lardieri | |
| 6,343,615 B1 | 2/2002 | Miller et al. | |
| 6,901,942 B2 | 6/2005 | Krimmer et al. | |
| 7,032,885 B2 * | 4/2006 | Rauch et al. | 251/308 |
| 7,574,797 B2 * | 8/2009 | Rauch et al. | 29/890.123 |
| 2005/0161629 A1 * | 7/2005 | Hannewald | 251/308 |
| 2007/0240676 A1 * | 10/2007 | Sasaki | 123/337 |
| 2009/0110476 A1 | 4/2009 | Patzelt | |

FOREIGN PATENT DOCUMENTS

| | | |
|---|---|---|
| GB | 1 253 430 A | 11/1971 |
| GB | 2 402 459 A | 12/2004 |
| WO | WO 96/04485 A1 | 2/1996 |

OTHER PUBLICATIONS

Extended Search Report from European Patent Application No. 11290497.4, dated Apr. 5, 2012.

* cited by examiner

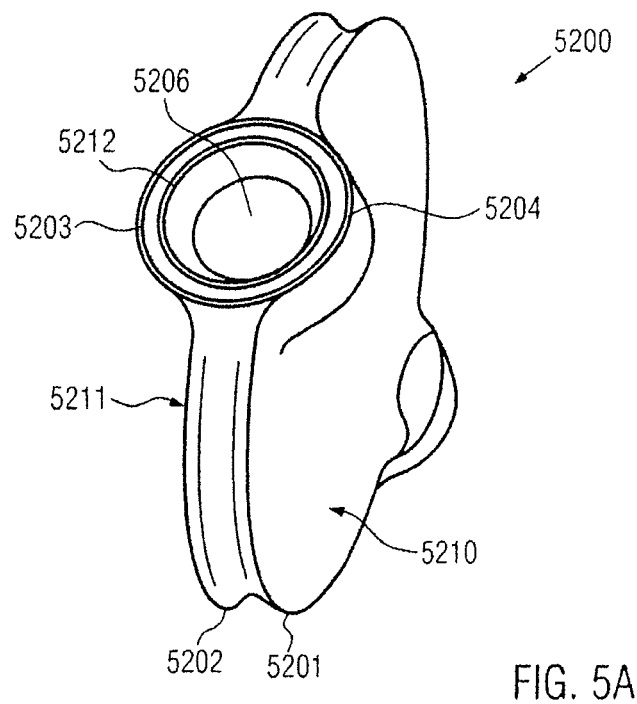
FIG. 5A
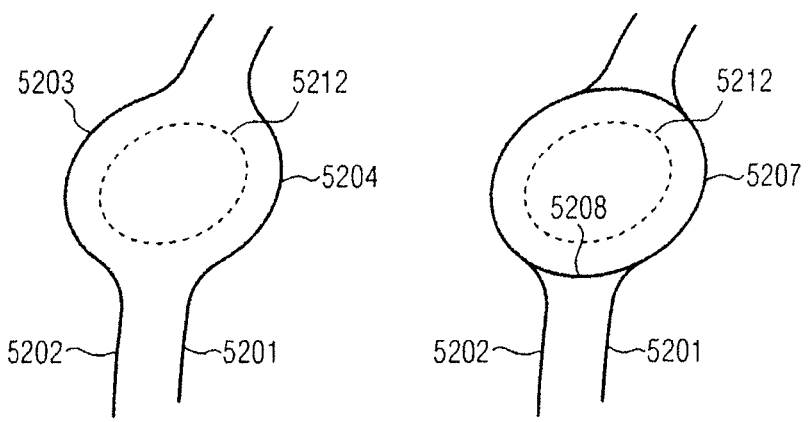
FIG. 5B
FIG. 5C

Prior Art

BODY FOR ACTUATED VALVE, CORRESPONDING ACTUATED VALVE AND THE MANUFACTURING PROCESS THEREOF

The present invention relates to a body for an actuated valve, the actuated valve comprising flow regulating means for regulating the flow of a fluid between an input bore and an output bore of the body, and actuating means for controlling a position of the flow regulating means, the body comprising at least the input bore and the output bore.

More specifically, in the field of fluid valves, the design of valves known as butterfly valves is known. These valves are effective in isolating or regulating a fluid flow. Moreover, this particular design is generally preferred to other designs because it is lower in cost and lighter in weight.

A butterfly valve, according to the state of the art, is illustrated in FIG. 7.

As can be seen in FIG. 7, the butterfly valve 2000 includes a body 2110 having an input bore 2111 and an output bore, facing the input bore, through which the fluid can flow. The butterfly valve further comprises a disc 2200 having a diameter substantially corresponding to the diameter of the input and/or output bore. The rotation of the disc 2200 allows the flow of the liquid from the input to the output bore, or vice versa, to be controlled.

The position of the disc 2200 can be controlled by placing an actuator on top of body 2110. The actuator can be fixed on top of the body 2110 thanks to the provision of holes 2001, 2002, and others not shown in the Figure, in the top section of body 2110. The actuator drives a drive shaft 1131 that is press-fit into an opening in the disc 2200 to open and close the butterfly valve 2000 by moving the disc 2200 around the drive shaft axis 1131. On the opposite side of the drive shaft an axis 1141 is press-fit into the disc. Using a press-fit connection any unwanted ejection of the dive shaft 1131 and/or the axis 1141 can be prevented. Furthermore, the drive shaft 1131 and the axis 1141 are spaced away from the internal wall body 2110 via cylindrical bearings 2302 and 2303. Legal requirements such as APSAD requirements request the presence of bearings while UL FM request a certain level of corrosion robustness.

FIG. 8 illustrates an actuated valve 3000 composed of a butterfly valve 2000 and an actuator 3300. The connection between the actuator 3300 and the butterfly valve 2000 can be achieved by means of screws 3001, 3002 and 3003 screwed through holes 2001, 2002, and others.

Such a design is rather cost intensive.

More specifically, it requires the cast of the actuator 3300, in addition to the cast of the butterfly valve 2000, and labour costs related to the connection of the two elements via screws 3001, 3002 and 3003. Moreover, in order to guarantee a correct alignment of the actuator 3300 and of the butterfly valve 2000, it is necessary to employ skilled labour force.

Furthermore, the connection by means of screws 3001, 3002 and 3003 requires a plurality of screws and a certain time duration for the placement of the screws. Additionally, the connection by means of screws 3001, 3002 and 3003 requires a quality control on the torque applied to the screws. In addition, a plurality of bearings has to be used to ensure the alignment of the drive shaft 1131 and the axis 1141 thereby increasing the number of parts that need to be assembled.

As the drive shaft 1131 and the axis 1141 are press-fit into the disc 2200, expensive materials like cupro aluminium have to be used.

Accordingly, it is an object of the present application to provide an actuated valve which does not suffer from the above mentioned problems and that can be manufactured with a low cost.

Such an objective is achieved by the teaching of the independent claims.

More specifically, the present invention can relate to a body for an actuated valve, the actuated valve comprising flow regulating means for regulating the flow of a fluid between an input bore and an output bore of a barrel, and actuating means for controlling a position of the flow regulating means, the body comprising a barrel having at least the input bore and the output bore; an actuating volume inside of which at least part of the actuating means can be placed wherein the barrel and the actuating volume are integrally formed in a single piece.

Thanks to such approach, since the barrel and the actuating volume are integrally formed in a single piece, at least part of the actuating means can be placed within the actuating volume of the body, without the need to realize an additional actuator volume with an additional cast. Moreover, costs related to the screws are saved, as well as the labour costs involved in the assembly of the actuator and of the body of the prior art.

In some embodiments, the actuating means can be a worm gear actuator.

Thanks to such approach, a compact actuator can be realized within the actuating volume.

In some embodiments, the flow regulating means is a disc.

Thanks to such approach, control of the fluid flow can be achieved with the required precision.

The object of the invention is also achieved with an actuated valve according to claim 4. The inventive actuated valve comprises a body, in particular as described above; flow regulating means for regulating the flow of a fluid between an input bore and an output bore of the body ; wherein the flow regulating means is at least partially coated with a sealing coating such that, in a closed state of the actuated valve, the sealing coating is placed between the flow regulating means and the body, characterized in that the sealing coating is shaped with one or more lips, in particular two lips along the entire perimeter of the flow regulating means for closing the gap between the flow regulating means and the body in a closed state of the actuated valve.

Thanks to the presence of the sealing coating on the means for regulating the flow, the valve achieves improved tightness in the closed state with a given closing torque compared to prior art coatings without the lips. Or for a given tightness property, it is possible to reduce the dimensions of the valve's actuator as less torque needs to be provided to close the valve, thereby reducing costs.

Preferably, the one or more lips are configured to extend around a shaft hole for receiving a drive shaft, and/or an axis hole for receiving and axis, provided in the flow regulating means. This prevents a fluid to leak out through the areas close to the drive shaft and/or the axis opposite to the drive shaft.

Advantageously, the sealing coating can further comprise a third lip surrounding the shaft hole and/or a fourth lip surrounding the axis hole of the flow regulating means. This further improves the tightness properties of the valve.

The object of the invention is also achieved with the actuated valve according to claim 7. The inventive actuated valve, that can also be combined with any one of the embodiments described above, comprises a body, as described above; flow regulating means for regulating the flow of a fluid between an input bore and an output bore of the body ; wherein an interior portion of the body is at least partially coated with a separating coating, to separate the body from a drive shaft connected to the flow regulating means and/or to separate the body from an axis connected to the flow regulating means.

Thanks to such approach, contact of the body and the shaft is prevented, without the usage of expensive bearings.

Preferably, the separating coating can be an electrophoretic coating of cataphoresis or any deposit that could penetrate inside the valves.

Thanks to such approach, the separating coating can be applied uniformly and with a reduced cost.

Advantageously, the separating coating has a thickness of 10 to 50 μm, preferably 40 μm.

Thanks to such approach, the separating coating provides the required robustness while the costs are contained.

Moreover, the present invention can relate to an actuated valve, that can also be combined with any one of the embodiments described above, comprising a body according to the previous embodiments; flow regulating means for regulating the flow of a fluid between the input bore and the output bore; actuating means for controlling the position of the flow regulating means, wherein at least part of the actuating means are placed within the actuating volume.

Thanks to such approach, an actuated valve can be realized at a reduced cost.

Moreover, the actuated valve can further comprise a valve indicator, for indicating the position of the flow regulating means.

Thanks to such approach, the position of the flow regulating means can be known, even when the flow regulating means itself is not visible.

The object of the invention is also achieved with the actuated valve according to claim 12. The actuated valve comprises a body and a flow regulating means, and could be combined with any one of the previously described embodiments. The actuated valve further comprises a drive shaft connected to the flow regulating means, wherein a clipping means is positioned in a recess of the drive shaft and at the same time in a groove in a recess inside the flow regulating means receiving a portion of the drive shaft.

Thus a detachment of the shaft from the flow regulating means can be prevented at a low cost and with a simple design. Indeed, instead of using expensive materials to enable a press-fit connection, here the flow regulating means can be made of a cast material and the drive shaft of simple steel.

Advantageously, the drive shaft can comprises one or more grooves for inserting tonic seals such that a contact of the drive shaft with the body or the coating can be prevented.

Thanks to such approach, contact of the shaft with the body is prevented at a low cost and with a simple design.

Preferably, the one or more groove can be arranged towards the extremity of the drive shaft that is opposite to the extremity connected to the flow regulating means.

Thus a negative influence of a fluid with a high temperature flowing through the valve on the lifetime of the seals can be reduced. Indeed, the seals are positioned far enough from the fluid so that high temperatures cannot reach the seals. Thus cheaper materials can be used.

Advantageously, the drive shaft can have a non-circular section towards at least one of its extremities.

Thanks to such approach, torque can be effectively transferred from the actuating means to the flow regulating means and the position of the flow regulating means with respect to the position of the actuating means can be fixed. Accordingly, manufacturing is simplified and costs are reduced.

Moreover, the present invention can relate to a process for the realization of an actuated valve comprising the steps of integrally forming a body, having a barrel and an actuating volume, by means of a cast; placing a flow regulating means within the body; and placing at least part of an actuating means within the actuating volume the body.

Thanks to such approach, an actuated valve can be realized at a reduced cost.

In some embodiment, the step of integrally forming the body is performed by casting, moulding or machining.

Thanks to such approach, an actuated valve can be realized via standard manufacturing technology.

The object of the invention is also achieved with the flow regulating means according to claim 18. The flow regulating means for a valve can also be combined with any one of the embodiments described above. The flow regulating means is at least partially coated with a sealing coating such that in a closed state, the sealing coating is placed between the flow regulating means and the body characterized in that the sealing coating is shaped with one or more lips, in particular two lips along the entire perimeter of the flow regulating means for closing the gap between the flow regulating means and the body in a closed state of the actuated valve.

Thanks to the presence of the sealing coating, the valve achieves better tightness in the closed state with a given closing torque. Accordingly, at a given accepted leakage, it is possible to reduce the dimensions of the valve's actuator, thereby reducing costs.

The invention will be described in more detail by way of example hereinafter using advantageous embodiments and with reference to the drawings. The described embodiments are only possible configurations in which the individual features may however, as described above, be implemented independently of each other or may be omitted. Equal elements illustrated in the drawings are provided with equal reference signs. Parts of the description relating to equal elements illustrated in the different drawings may be left out. In the drawings, FIGS. 1, 2 and 3 are a schematic perspective view of a body for an actuated valve and of an actuated valve in accordance with a first embodiment of the present invention;

FIGS. 5A to 5C illustrates valve discs 5200 in accordance with embodiments of the present invention;

Figure 1:
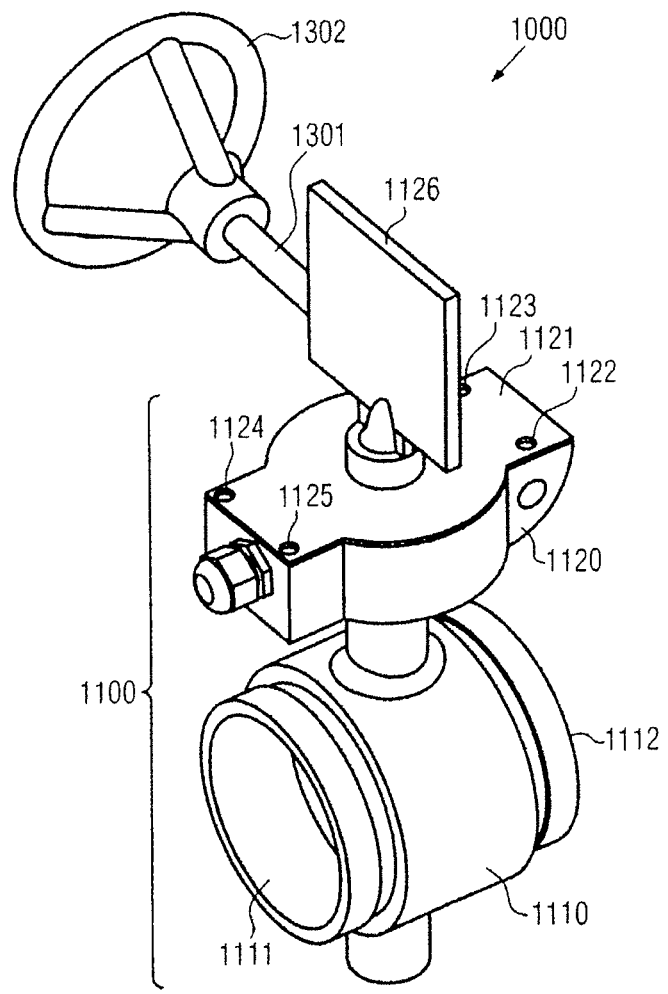
Figure 2:
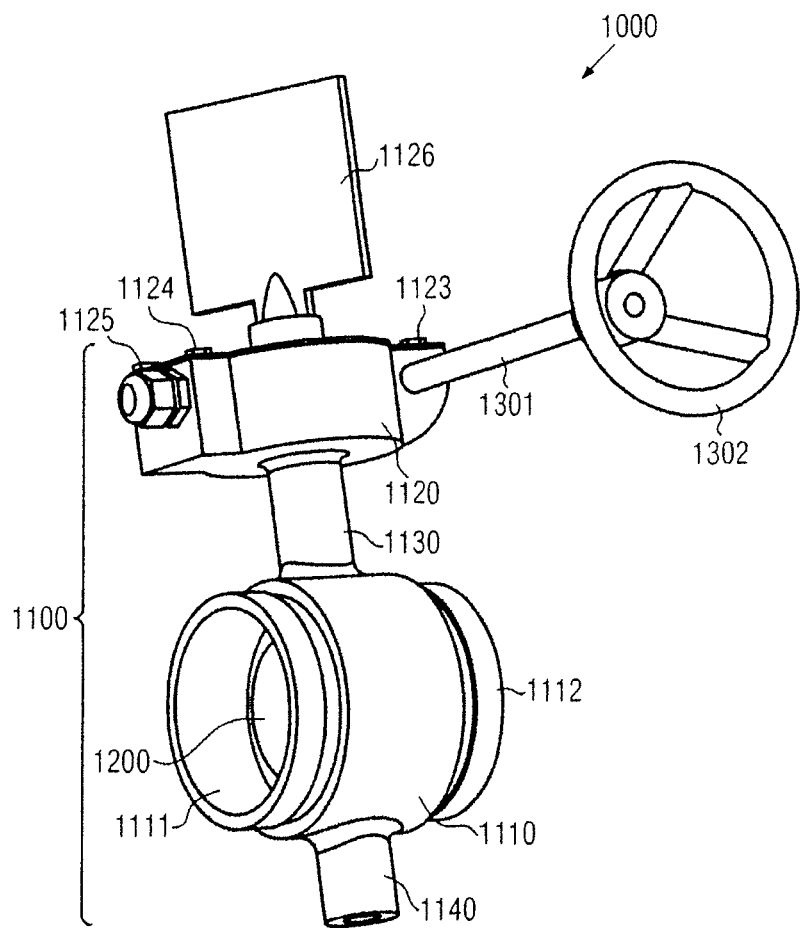
Figure 3:
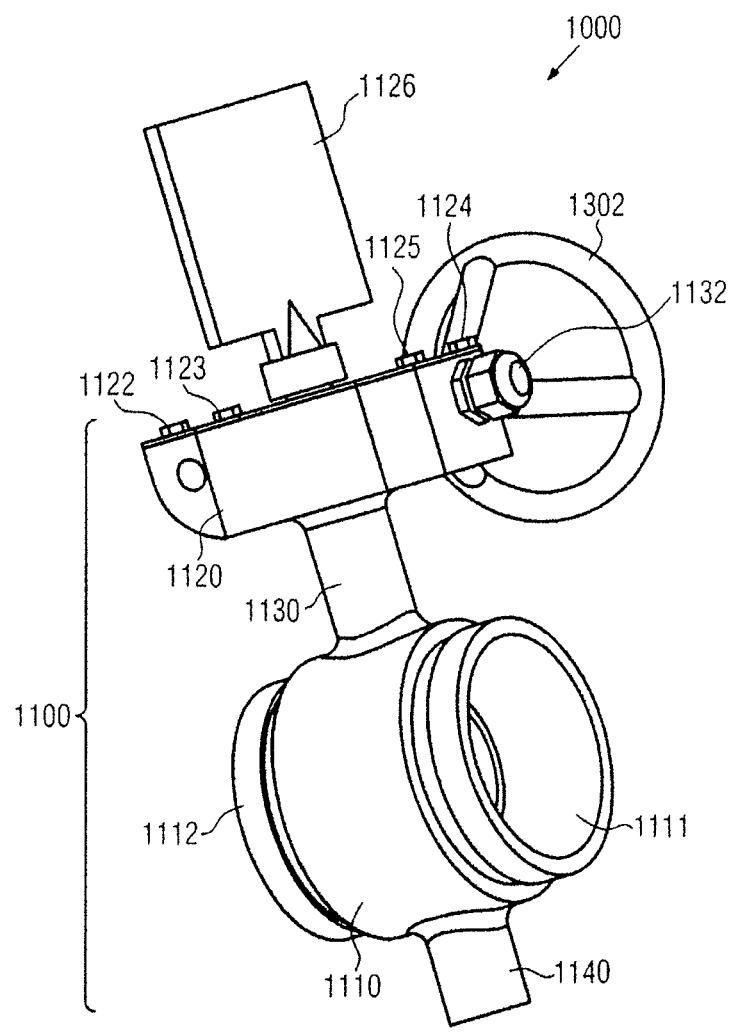

A body 1100 for an actuated valve 1000 will be described with reference to FIGS. 1, 2 and 3. FIGS. 1, 2 and 3 are schematic perspective views of the body 1100 and of the actuated valve 1000 in accordance with a first embodiment of the present invention.

As can be seen in the figures, the body 1100 includes a barrel 1110 having an input bore 1111 and an output bore 1112. A fluid can therefore flow from the input to the output bore, or vice versa, depending on the position of disc 1200. Accordingly, the disc 1200 acts as a flow-regulating means according to the invention. The position of the disc 1200 is controlled by means of a shaft 1131, not visible in FIGS. 1-3, extending through pillar 1130. More specifically, the shaft 1131 connects disc 1200 to an actuating means 1300 placed on top of pillar 1130. The actuating means 1300 is placed, at least partially, within an actuating volume 1120. An axis 1141 aligned with the drive shaft 1131 is positioned inside pillar 1140 and connects to the disc 1200 on the opposite side to allow a smooth movement of the disc inside the barrel 1110.

In this case, the actuating volume 1120 is realised integrally with the pillar 1130 and with the barrel 1110 having at its end the input bore 1111 and the output bore 1112. The combination of the actuating volume 1120, the barrel 1110 and the pillar 1130 forms the body 1100. By realised integrally, or integrally formed, it is meant that the elements are formed in a single piece in particular by way of molding, casting or machining. This is opposed to the case where the elements are formed separately and then connected together via screws.

At least part of the actuating means 1300 can be realised within the actuating volume. More specifically, as can be seen from the figures, the actuating volume 1120 has a hole 1127 through which a shaft 1301 extends. The shaft 1301 is connected to a control wheel 1302. By turning the control wheel 1302, a worm actuator 1303, 1304 placed within the actuating volume 1120 can be engaged. The movement of the worm actuator is transferred by means of the shaft 1131 extending through pillar 1130 to the disc 1200. In such a manner, it is possible to control the disc 1200 via the control wheel 1302.

Moreover, the actuating volume 1120 can be closed by means of cover 1121, so that the part of the actuating means 1300 placed within the actuating volume can be isolated from the external environment. This can be advantageous so as to protect the gears of the worm actuator, which may be placed within the actuating volume 1120. Cover 1121 can be kept in place on top of actuating volume 1120 by means of screws 1122, 1123, 1124, and 1125. In this embodiment the cover 1121 is a simple plane plate, e.g. a pierced metal sheet plate.

Thus, according to the invention, the actuating volume 1120 is realized integrally with the barrel 1110 so as to form a single valve body 1100. This has the advantage that all the geometrical complexity of the valve 1000 is realized within one work piece.

In addition, compared to the prior art, the interface between the cover 1121 and the valve body 1100 is simplified. Indeed the interface between the cover 1121 and the valve body 1100 is flat. So that a flat tight material can be used to provide the necessary tightness between the of the elements in the design according to the invention. As a consequence, there is no need for a groove to position an o-ring and/or an even more complex sealing means.

By providing the valve body 1100 and the simplified cover 1121 according to the invention, it becomes possible to reduce the total cost of the work pieces, as all complexity of the geometry is now in one piece only and less screws are needed for assembly. In addition less fabrication steps are necessary for the integration and the assembly is simplified.

Above the cover 1121, a valve indicator 1126 can be provided. The valve indicator 1126 of this embodiment consists in a flat surface which turns in correspondence with the disc 1200. In this manner, when the valve 1000 is in operation, the position of the disc 1200 can be known from the indicator. In order to achieve such functionality, the valve indicator 1126 could be connected directly on top of the shaft 1131 extending through pillar 1130. Alternatively, the valve indicator could be connected to a moving part of the actuating means 1300 which moves together with the shaft.

Although the valve indicator 1126 is described as a flat surface, the present invention is not limited to this. Alternatively, the valve indicator could be a volume, such as a sphere or as a cube, including indications, such as a bore, or an engraved text or arrow, describing the current position of the disc 1200.

Moreover, although the drawings include a nut 1132 on the side of the actuating volume 1120, the present invention is not limited to this. More specifically, the nut 1132 on the right side of actuating volume 1120 in FIG. 3 is a wire packing gland for electric connection of the gearbox and can be used in order to receive instructions of the switch. However, the present invention can also be realized without the presence of the nut 1132.

Figure 4A:
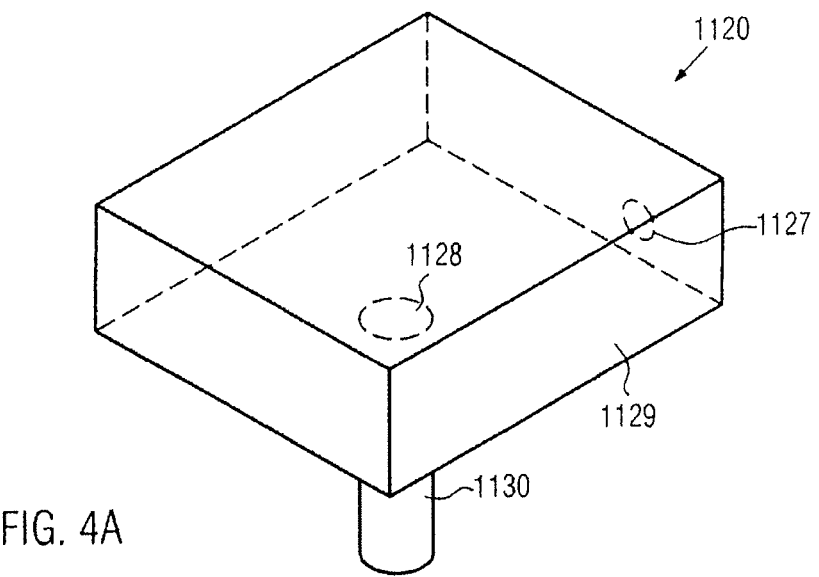
FIGS. 4a and 4b are schematic perspective view of an actuating volume and at least part of the actuating means in accordance with an embodiment of the present invention.
Figure 4B:
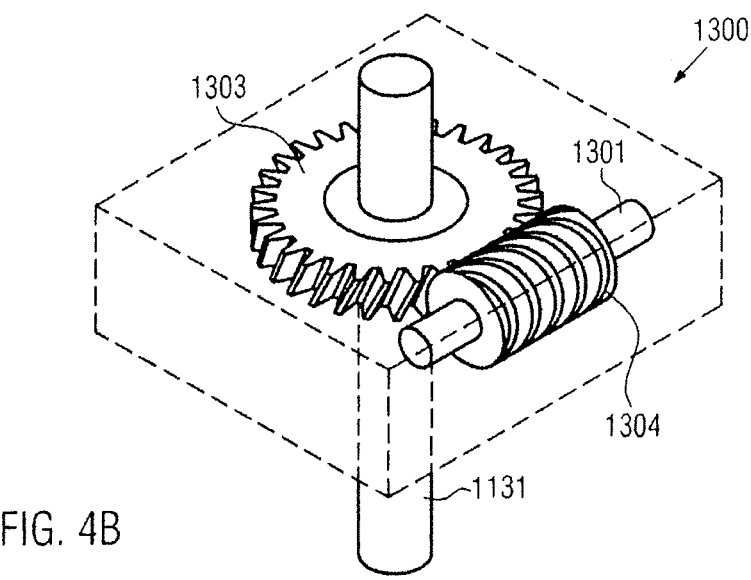

FIGS. 4A and 4B are schematic perspective view of an actuating volume 1120 and at least part of the actuating means 1300 in accordance with an embodiment of the present invention.

As can be seen in FIG. 4A, the actuating volume 1120 of the present embodiment comprises a surface 1129, molded as a single piece with pillar 1130. In the part of surface 1129 placed above pillar 1130, a hole 1128 is provided. The purpose of hole 1128 is to allow the passage of shaft 1131 connected to the disc 1200. Furthermore, the actuating volume has four vertical surfaces. In one of these vertical surfaces, a hole 1127 is provided for the passage of shaft 1301.

As can be seen in FIG. 4B, shaft 1301 is connected to worm 1304. Shaft 1131 is connected to worm gear 1303. Worm gear 1303 and worm 1304 are placed so as to realize a work gear actuator. That is, by driving shaft 1301, the worm 1304 transfers this movement to the worm gear 1303, thereby moving the disc 1200 via the shaft 1131.

Furthermore, the shaft 1131 extends above worm gear 1303 so that valve indicator 1126 can be mounted on the part of shaft 1131 extending outside of cover 1121.

Worm gear 1303, worm 1304, and the parts of shafts 1301 and 1131 which are within the actuating volume correspond to the parts of the actuating means 1300 within the actuating volume.

Accordingly, the body 1100 allows the realisation of an actuated valve 1000 having an integral actuating volume 1120 where at least part of the actuating means 1300 can be realised. More specifically, worm gear 1303, worm 1304, and parts of shafts 1301 and 1131 can be placed within the actuating volume 1120. This is advantageous since it does not require a separate realisation of the barrel 1110 and of the actuating volume 1120. In turn, this implies that the labour force necessary for connecting those two parts by means screws is no required anymore. This further has the advantage that a perfect alignment of the actuating means, within the actuating volume, and of the barrel 1110 can be achieved.

FIG. 5A illustrates a valve disc 5200 in accordance with a second embodiment of the present invention. The valve disc 5200 can be used as valve disc 1200 in the first embodiment but can also be used with any other type of butterfly valve.

The disc 5200 is coated by a sealing material to prevent leaking of the valve in the closed state. Sealing lips 5201 and 5202, of the sealing material, are formed along the circumference of the disc 5200. Here sealing lip 5201 is formed at or on the edge on the circumferential region towards the one main side 5210 of the disc and the second sealing lip 5202 is formed at or on the edge on the circumferential region towards the second main side 5211 opposite the first main side 5210 of the disc 5200.

Additionally, the lips 5201 and 5202 further extend around the drive shaft hole 5206. This is illustrated in FIG. 5A by reference numerals 5203 and 5204 being the continuation of lips 5202 and 5201, respectively. In such a manner, leakage from the inlet to the outlet is prevented by the presence of two sealing lips along the entire circumference of the valve disc 5200. Although not illustrated in the figure, an equivalent lip structure is also realized around the opening in the disc 5200 on the opposite side of the disc 5200 facing the pillar 1140, and having an opening for the axis 1141 inserted into pillar 1140.

Thanks to the presence of the sealing lips 5201, 5202, 5203 and 5204 along the entire perimeter of the disc 5200, a reduced closing torque for the valve is necessary in order to achieve the same level of leakage tightness compared to a sealing material that covers the entire disc but without the lip structure. This results in lower design requirements for the actuating means, which can therefore be realized by using less material or by using materials having a lower cost. Accordingly, thanks to the provision of the sealing lips of sealing material on at least one side of the disc, the valve can be realized at a lower cost. Similarly, the provision of the sealing lips results in an increased tightness against leakage for a given actuating means providing a given closing torque. Accordingly, a given valve can be made to satisfy harder leakage requirements by adding the sealing lips. This results in the fact that, at the same price, better performances can be obtained. In both situations, cost reduction of the valve can therefore be achieved.

According to a variant of this embodiment, an additional sealing lip 5212 can be provided around the recess forming the drive shaft hole 5206 and the recess for the axis on the opposite side of the disc. By doing so a double sealing is also achieved with respect to the possible leak paths via the drive shaft and the axis of the butterfly valve.

Although in FIG. 5A the lips have been specified as being on both sides of the disc 5200, the present invention is not limited thereto and a single lip could be realized on just one side of the disc 5200. For instance, referring to the disc 5200 in FIG. 5, only sealing lip 5201 and 5204 could be realized.

Additionally, although the embodiment has been described with reference to two distinct sealing lips 5203 and 5204 surrounding the region in which shaft 1131 is inserted, the present invention is not limited thereto. Alternatively, or in addition, a single sealing lip 5207 comprising both lips 5203 and 5204 could be realized so as to completely surround the region of the disc housing the drive shaft 1131. Such a single sealing lip could then be integrated with sealing lips 5201 and 5202.

More specifically, FIG. 5B illustrates more in detail the configuration of FIG. 5A in which lip 5204 is a linear continuation of lip 5201 and lip 5203 is a linear continuation of lip 5202. In particular, this provides the advantage of presenting a single continuous sealing lip to the fluid which is to be stopped by the valve. On the other hand, FIG. 5C illustrates a circular lip 5207 placed around the region in which drive shaft 1131 is to be inserted and being connected to lips 5201 and 5202. This combination achieves the same result of FIG. 5B in presenting a continuous lip to the fluid being stopped by the valve, thereby reducing leakage. Additionally, due to the present of the lip portion 5208 of circumferential lip 5207 between lips 5201 and 5202, even in the presence of leakage through lips 5201 and 5202, leakage of fluid into the actuating volume, which may result in damage of the actuating means, is further prevented.

In the sealing structures according to FIGS. 5B and 5C, the additional seal 5212 for sealing against the drive shaft hole and the recess for the axis, can also be provided. It is therefore illustrated in dotted lines.

The sealing material may be any of EPDM or NITRILE. It could be deposited by a molding process. The sealing material is not necessarily provided on the entire surface of the disc 5200 and the deposition may be limited to the regions in which the lips are realized.

Figure 8:
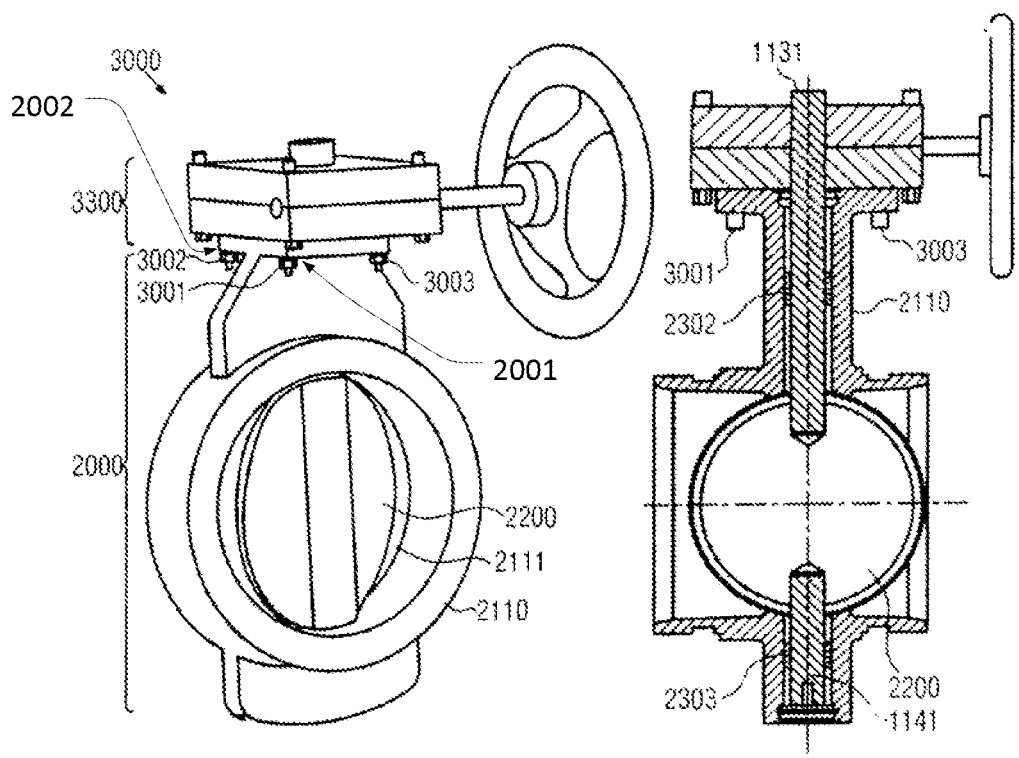
FIG. 8 is a schematic perspective and sectional view of an actuated valve in accordance with the state of the art.

Although the above embodiment has been described with reference to the actuated valve 1000 of FIG. 1, the invention is not limited to this. In particular, the provision of the sealing lips could be implemented independently and/or on any valve such as, for instance, the actuated valve 3000 of FIG. 8.

Figure 6A:
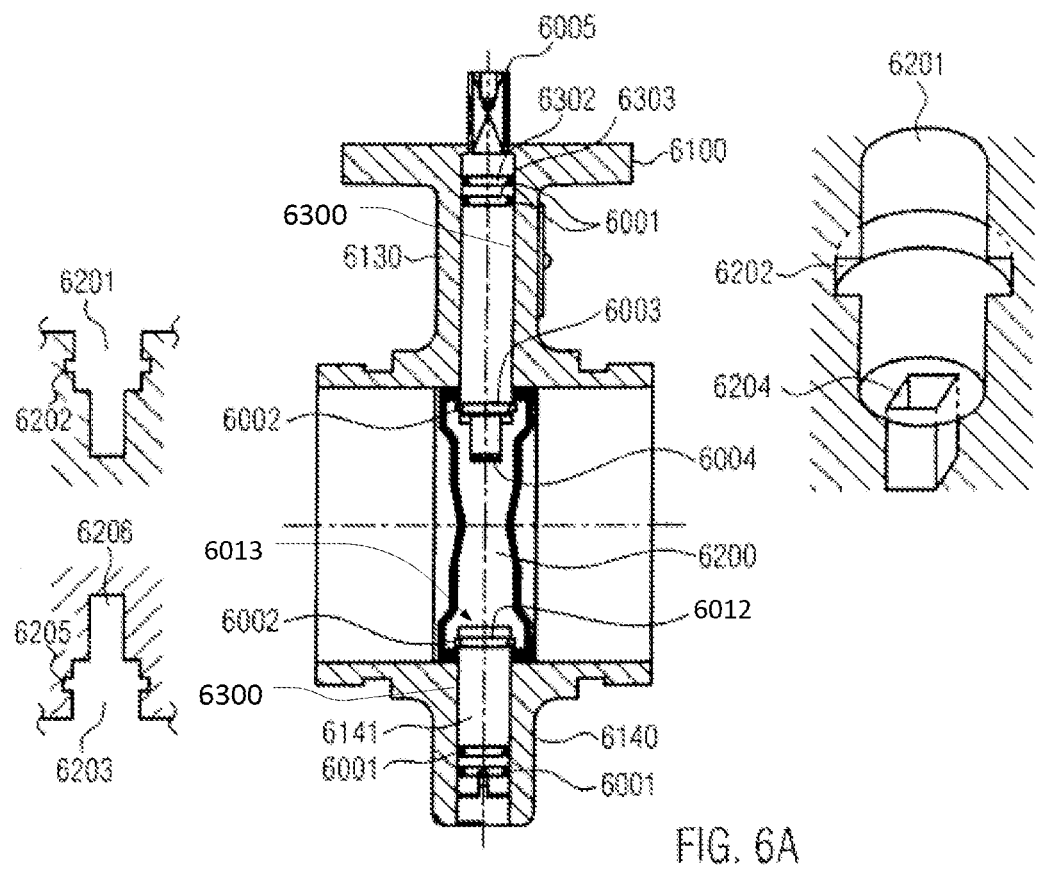
FIGS. 6A and 6B illustrate a valve body 6100, a shaft 6131 and a valve disc 6200 in accordance with embodiments of the present invention.
Figure 6B:
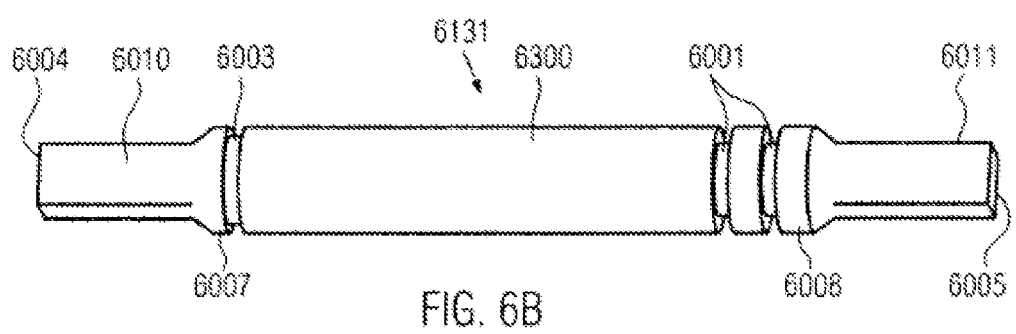
Figure 7:
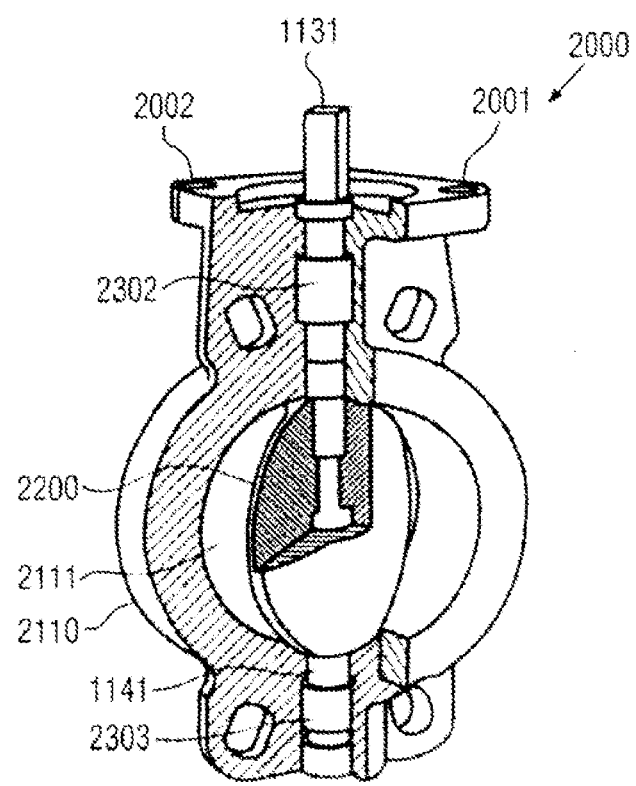
FIG. 7 is a schematic perspective view of a body of a butterfly valve in accordance with the state of the art.

FIGS. 6A illustrates schematically a valve body 6100, a shaft 6131, an axis 6141 and a valve disc 6200 in accordance with further embodiments of the present invention. FIG. 6A represents only part of a valve body 6100, without the actuating volume and the actuating means, for clarity of illustration. FIG. 6B illustrates the shaft 6131. The valve body 6100 can be used as a valve body in the previous embodiments but can also be independently used with any other type of valve, in particular, in valves such as the one in FIG. 8. Similarly, the shaft 6131 and/or the axis 6141 and/or the disc 6200 can be used in combination with the previous embodiments, but can also be independently used with any other type of valve, in particular, in valves such as the one in FIG. 8.

In order to avoid blowout of the drive shaft 1131 and the consequent damaging of the actuating means and potential failure of the valve, it is known to press fit a steal shaft into an aluminium bronze disc in particular or a soft material disc in general and/or using a screw screwed into a recess of the shaft. However, such design is rather expensive due to the usage of expensive material, or the anti ejection preventing means can be intentionally or unintentionally violated, e.g. by omitting the screw.

On the other hand, a drive shaft 6131 and a valve disc 6200 in accordance with embodiments of the present invention are kept together by the presence of clipping means 6002. In particular, the disc 6200 is cast and comprises a first internal recess 6201 comprising a groove 6202 into which one or more clipping means 6002 can be inserted. The shape of the recess 6201 without the clipping means 6002 and the drive shaft 6131 is illustrated in the enlarged portion to the left of FIG. 6A. For instance, the clipping means 6002 can be a circlip or a retaining ring. Upon insertion of the shaft 6131 into the pillar 6130 of valve body 6100, the clipping means 6002 is opened by the passage of the shaft 6131.

In particular, the drive shaft 6131 has a shape with an end 6004 having a diameter smaller than the diameter of the clipping means 6002 at rest. In this manner, it is possible to successfully insert the shaft 6131 into the clipping means 6002 and to subsequently press the shaft further into the disc 6200. The diameter of the shat 6131 increases, toward a value larger than the value of the diameter of the clipping means 6002 at rest, when moving away from end 6004. Accordingly, by inserting the shaft 6131 into the valve disc 6200, the clipping means 6002 is extended to a value in which the clipping means 6002 exerts a spring force to return back to its rest position. The drive shaft 6131 then has a substantially abrupt diameter reduction due to the presence of a recess 6003. Accordingly, the clipping means 6002 can spring back to a lower spring potential and/or to its rest state and locks the drive shaft 6131 in the first recess 6202 of the disc 6200. In this manner, it is possible to easily insert the shaft 6131 into the clipping means 6002. Additionally, due to the abrupt diameter change in correspondence with the recess 6003, blowout of the shaft 6131 is also prevented. In fact, while the diameter of the shaft 6131 increases from the end 6004 toward the recess 6003, it decreases abruptly in correspondence of the recess 6003. Accordingly, once the clipping means 6002 engages on the recess 6003, movement of the shaft 6131 away from the valve disc 6200 is prevented. Moreover, the recess 6003 can also have a shape such that the diameter of the drive shaft 6131 increases abruptly from the recess 6003 moving toward end 6005 of the shaft 6131.

Thanks to this design, it is possible to securely and stably place the drive shaft 6131 into the disc 6200 since movement of the drive shaft 6131 once the clipping means 6002 has entered the recess 6003 is prevented along both longitudinal directions.

To facilitate the introduction of the drive shaft 6131 into the first recess 6002 and to facilitate the opening of the clipping means 6002, the drive shaft comprises first and second bevelled areas 6007 toward end 6004 and 6008 towards end 6005 of the drive shaft 6131.

Although the present embodiment has been described with reference to the placement of drive shaft 6131, a similar arrangement may also be implemented for the axis 6141 on the opposite side of the disc 6200. Thus the disc 6200 comprises a second recess 6203, illustrated in the enlarged view to the right in FIG. 6A, also comprises a region 6204 with a second groove 6205 in its sidewall 6206. The groove 6205 receives a second clipping means 6002. The second recess 6203 is arranged on the opposite side of the disc 6200 with respect to the first recess and receives the axis 6141 with a recess 6012 towards its end 6013 entering the second recess 6203. In the mount state the second groove 6205 and the recess 6012 are aligned and an ejection of the axis is prevented by the presence of the clipping means 6002 arranged therein.

Furthermore, although the above embodiment has been described with reference to the actuated valve 1000 of FIG. 1, the invention is not limited to this. The design of disc 6200 with the clipping means 6002 to prevent blowout and/or the design of the shaft 6131 and/or the design of the axis 6141 can also be combined with the double lip sealing structure as illustrated in FIG. 5a or more generally could be implemented independently and/or on any valve such as, for instance, the actuated valve 3000 of FIG. 8.

In a further additional embodiment in accordance with the present invention, which is also independent of the other embodiments, the regions 6010 and 6011 close to the extremities 6004 and 6005 of the drive shaft 6131 have a non-circular section and/or two sections with a fixed geometric relationship. More specifically, both sections 6010 and 6011 of end regions 6004 and 6005 may be square, rectangular, elliptical, or circular with a cut portion, or, more generally, any section that does not have a circular symmetry.

At the same time first recess 6201 of disc 6200 as illustrated to the right in FIG. 6A, also comprises a region 6204 with a non-circular section mating the non-circular region 6010 of the drive shaft 6131. The provision of a non-circular section 6010 and 6204 makes it possible to transmit torque via the shaft 6131 in a more robust manner than in the case of a circular section. Similarly, recess 6203 comprises a non circular section 6206.

The non-circular section 6011 serves to connect the drive shaft 6131 to the actuator and in particular to a valve indicator like e.g. the one illustrated in FIG. 1 with reference numeral 1126. The fixed geometric relationship between the two non-circular regions 6010 and 6011 at the extremities of the drive shaft ensures a fixed relationship between the disc and the actuator/valve indicator so that a closed state of the valve corresponds to a closed state indication by the valve indicator. As an example, if the non circular section 6010 near the end 6004 of the drive shaft 6131 is rectangular, only two positions are available for inserting the shaft 6131 within the corresponding non-circular region 6204 first recess 6201 in disc 6200. In this particular example, the section being rectangular, the two positions for inserting the shaft into the disc are symmetrical. Accordingly, independently of which of the two positions the shaft 6131 is inserted into the disc, alignment of the disc 6200 with the actuating means 1300/the valve indicator 1126 can be achieved. In such a manner, a calibration of the position of the disc with respect to the position of the actuating means is not necessary. Accordingly, a reduced cost for the realization of the valve can be achieved.

Furthermore, the section 6010 of end 6004 does not necessarily have to be the same as the section 6011 of end 6005. For instance, one could be elliptical while the other could be squared. As long as a section is non-circular, transfer of torque by that section is improved. Further, as long as the two sections are in a know relationship, the positioning of the disc 6200 with respect to the actuating means 1300 is guaranteed.

Although the above embodiment has been described with reference to the actuated valve 1000 of FIG. 1, the invention is not limited to this. In particular, the provision of non-circular sections for the end 6004 and/or end 6005 could be implemented independently and/or on any valve such as, for instance, the actuated valve 3000 of FIG. 8.

In a further embodiment of the present invention, also illustrated in FIGS. 6A and 6B, but representing a further independent invention, the drive shaft 6131 is isolated from the body 6100 of the butterfly valve, more specifically from the interior of pillar 1130. Usually, such isolation is achieved by using one or more cylindrical bearings 2302 on the shaft. However, the presence of cylindrical bearings increases the cost of the valve, since it requires additional components. Further, the complexity of the manufacturing of the valve with the placement of bearings 2302 is also increased, thereby additionally increasing the costs.

According to the invention of the present embodiment, the bearings are replaced by a coating 6300. The coating 6300 could be realized on the shaft 6131 and/or on the valve body 6100. The coating 6300 is preferably an electrophoretic deposition of cataphoresis or any deposit that could penetrate inside the valves, with a thickness in the range of 10 to 50 µm preferably 40 µm.

This type of coating 6300 has the advantage of a good anti-corrosion protection, and/or good adhesion, and/or application by immersion, and/or repeatability of thickness, and/or robustness.

It is understood that a similar approach of providing a coating 6300 could be used for axis 6141 and/or the region of body 6100 surrounding axis 6141.

Although the above embodiment has been described with reference to the actuated valve 1000 of FIG. 1, the invention is not limited to this. In particular, the provision the coating could be implemented independently and/or on any valve such as, for instance, the actuated valve 3000 of FIG. 8 and/or with any other embodiment as described above.

In a further variant of the present invention, which is also independent of the other embodiments, one or more toric and/or tubular seals 6302, 6303, 6304, 6305 can be positioned on the axis 6141 and/or the drive shaft 6131 to prevent friction between the drive shaft 6131 and/or the axis 6141 and the body 6100. In FIGS. 6A and 6B the location in which the torque seals can be placed on the drive shaft 6131 are indicated by grooves 6001. The axis 6141 also comprises one or two or more grooves in a similar way. The seals may be positioned far from the disc 6200, so as to reduce the influence of the temperature of the fluid circulating inside, on the seals. Furthermore, the positioning close to the extremity away from the disc prevents that the seals roll on themselves and/or break and/or get damaged during integration of the valve. Additionally, by placing them away from the disc 6200, visual inspection allows to check whether any damage is present in the cast and/or the coating close to the position of the seals and/or in the seals once in place. Still further, the presence of two or more seals allows a stable positioning of the shaft 6131 and/or of the axis 6141 within pillars 6130 and 6140.

In the above embodiments, for allowing an easier understanding of the Figures, all other components of the actuating means, such as gaskets, bearings, etc have not been included in the Figures.

Although in the abovementioned figures, the barrel 1110 is connected to the actuating volume 1120 by means of a pillar 1130, the present invention is not limited to this. Alternatively, the actuating volume 1120 could be realised directly attached to the barrel 1110.

Moreover, although the actuating volume 1120 is shown as being closed by means of four screws 1122-1125, the present invention is not limited to this. Alternatively, or in addition, any other method for closing the volume could be employed. For instance, the cover 1121 could be kept in place by a different number of screws. Still alternatively, or in addition, the cover 1121 could be glued to the body 1100. Further, alternatively, or in addition, the cover 1121 could be welded to the body 1100. Further, alternatively, or in addition, the cover 1121 could be mechanically press fit to the body 1100.

Although the actuated valve 1000 of the present invention is shown as being a butterfly valve, the present invention is not limited to this. Alternatively, the valve could be any other kind of valve, such as a ball valve, or a gate valve.

Moreover, although in the present invention the actuating means comprising the shaft 1301, the control wheel 1302, the worm 1304 and the worm gear 1303, realise a worm gear actuator, the present invention is not limited to this. Alternatively, the actuating means could be any of a pneumatic or an electric actuator or a handle, as long as at least part of the actuating means are placed within the actuating volume 1120.

Moreover, although the actuating volume has been described as a volume 1120 which can be closed by a cover 1121 on one side, the present invention is not limited to this. Alternatively, or in addition, the volume could be closed on more than on side by an appropriately shaped cover, or by a plurality of covers.

Additionally, the above-described embodiments can be implemented independently of each other. Alternatively, or in addition, features from two or more embodiments can be combined.

The invention claimed is:

1. An actuated valve comprising:
    a body comprising:
        a barrel having at least an input bore and an output bore, wherein the actuated valve is for regulating the flow of a fluid between the input bore and the output bore of the barrel; and
        an actuating volume configured to receive at least part of actuating device within the actuating volume;
        the barrel and the actuating volume being integrally formed in a single piece;
    a flow regulating device for regulating the flow of a fluid between the input bore and the output bore of the body, the flow regulating device including at least one of a shaft hole for receiving a drive shaft and an axis hole for receiving an axis;
    the flow regulating device being at least partially coated with a sealing coating shaped with one or more lips extending along a perimeter of the flow regulating device, such that, when the actuated valve is in a closed state, the one or more lips of the sealing coating are placed between the flow regulating device and the body, in order to close one or more gaps between the flow regulating device and the body; and
    at least one of a third lip and a fourth lip extending, respectively, around at least one of the shaft hole and the axis hole, the at least one of the third lip and the fourth lip forming a linear continuation of the one or more lips to provide a continuous sealing lip for the actuated valve.

2. The actuated valve according to claim 1, wherein an interior portion of the body is at least partially coated with a separating coating, to separate the body from the drive shaft and/or to separate the body from the axis connected to the flow regulating device.

3. The actuated valve according to claim 2, wherein the separating coating is an electrophoretic coating of cataphoresis or any deposit that could penetrate inside the interior portion of the body.

4. The actuated valve according to claim 2, wherein the separating coating has a thickness of 10 to 50 µm.

5. The actuated valve according to claim 2 wherein the separating coating has a thickness of approximately 40 µm.

6. The actuated valve according to claim 1, further comprising:
    an actuating device for controlling the position of the flow regulating device, wherein at least part of the actuating device is placed within the actuating volume.

7. The actuated valve according to claim 6, further comprising:
    a valve indicator, for indicating the position of the flow regulating device.

8. The actuated valve according to claim 1, wherein a clipping device is positioned in a recess of the drive shaft and at the same time in a groove inside the shaft hole.

9. The actuated valve according to claim 1, wherein the drive shaft comprises one or more grooves for inserting toric and/or tubular seals such that a contact of the drive shaft with the body or the coating is prevented.

10. The actuated valve according to claim 9, wherein the one or more grooves are arranged towards a first extremity of the drive shaft that is opposite to a second extremity of the drive shaft that is connected to the flow regulating device.

11. The actuated valve according to claim 9, wherein the drive shaft has a non-circular section towards at least one of its extremities.

12. An actuated valve comprising:
    a flow regulating device for regulating the flow of a fluid between an input bore and an output bore of a barrel;
    a drive shaft connected to the flow regulating device at a shaft hole in the flow regulating device; and
    an axis connected the flow regulating device at an axis hole that is opposite the shaft hole on the flow regulating device;
    an actuating device for controlling a position of the flow regulating device;
    a body, the body comprising:
        a barrel having at least the input bore and the output bore; and
        an actuating volume configured to receive at least part of the actuating device within the actuating volume;
        the barrel and the actuating volume being integrally formed in a single piece;
    the flow regulating device being at least partially coated with a sealing coating shaped with one or more lips along a perimeter of the flow regulating device, such that, when the actuated valve is in a closed state, the one or more lips of the sealing coating are placed between the flow regulating device and the body, in order to close one or more gaps between the flow regulating device and the body;

a third lip extending around the shaft hole and a fourth lip extending around the axis hole, each of the third lip and the fourth lip forming a linear continuation of the one or more lips to provide a continuous sealing lip for the actuated valve.

* * * * *